N. D. LEVIN.
MOTOR VEHICLE.
APPLICATION FILED JUNE 19, 1908.
1,062,172.
Patented May 20, 1913.
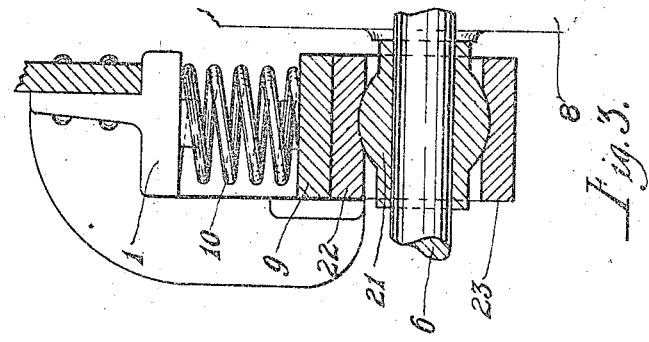
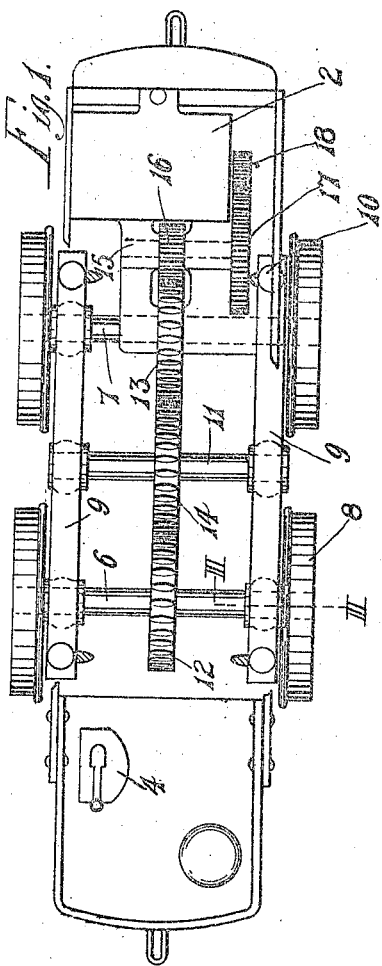
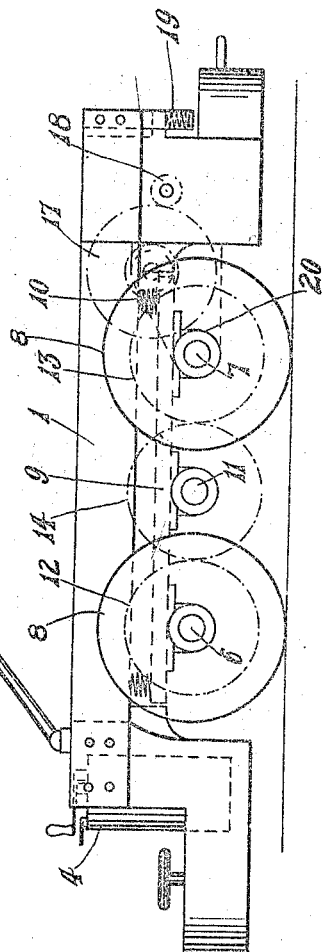

UNITED STATES PATENT OFFICE.

NILS DAVID LEVIN, OF CHICAGO, ILLINOIS, ASSIGNOR TO THE JEFFREY MANUFACTURING COMPANY, OF COLUMBUS, OHIO, A CORPORATION OF OHIO.

MOTOR-VEHICLE.

1,062,172.  Specification of Letters Patent.  Patented May 20, 1913.

Application filed June 19, 1908. Serial No. 439,341.

*To all whom it may concern:*

Be it known that I, NILS D. LEVIN, a citizen of the United States, residing at Chicago, in the county of Cook and State of Illinois, have invented certain new and useful Improvements in Motor-Vehicles, of which the following is a specification.

The invention relates to motor vehicles, and particularly electric locomotives. The invention has for its primary objects, the provision of a construction wherein the axles are free to move independent of the frame without interference with the mechanism for driving the wheels, and transmitting a minimum of such movement to the body of the vehicle; the provision of an improved means for flexibly mounting the motor; and the provision of an improved and simplified means for driving the axles from the motor. One embodiment of the invention is illustrated in the accompanying drawings, wherein:—

Figure 1 is a plan view of the locomotive with the top framing or body removed to disclose the drive gearing.

Figure 2 is a side elevation, and

Figure 3 is an enlarged detail section on the line III—III of Figure 1.

Referring to the drawings, 1 is the body of the locomotive, 2 is an electric motor, 3 is the trolley pole, 4 is the controller, 5 is the trolley wire, 6 and 7 are the axles, which axles carry the wheels 8 and are journaled in the independent wheel frames, 9—9, one of which is mounted on each side of the body of the vehicle.

10 are springs interposed between the frames 9—9 and the body 1, 11 is a counter-shaft mounted upon the frames 9—9, 12 and 13 are spur gears keyed respectively to the shafts 6 and 7, 14 is a spur gear keyed to the counter-shaft 11 and meshing with the gears 12 and 13, 15 is a shaft journaled in the motor casing and carrying the gears 16 and 17, which mesh respectively with the spur gear 13, and with the driving pinion 18 of the motor, and 19 is a spring for resiliently supporting one side of the motor from the framing or body 1, the other side of the motor being extended to constitute the bearing 20, which bearing incloses the axle 7, thus giving a pivotal support to the motor on one side of its axis, and a spring support on the other side.

The ends of the axles 6 and 7 and of the counter-shaft 11 are mounted for universal movement in the framing 9—9 in the manner indicated in enlarged detail in Figure 3. As here shown the journal-box 21 is made in spherical shape and fits in rounded recesses in the casing 22 and cap 23, which members are secured to the frame 9. This arrangement permits a certain amount of movement of the axles with respect to the framing as the wheels follow irregularities in the track. The vibration of the body of the vehicle is in this manner largely reduced, as the wheels and axles may tilt a certain amount without transmitting the tilting to the body. Wear on the journals and on the boxes is also greatly reduced, as the boxes twist with the axles, and there is no undue strain or wear thrown upon the contacting surfaces by reason of binding when the irregularities in the road-bed tend to throw the axles out of their normal position with respect to the framing.

As shown in Figure 1 the spur gears 12, 13 and 14 are provided with what may be termed "rounded teeth," that is the teeth are thickest at their central portion and taper to the edges. The purpose of this tooth-construction is to permit a proper engagement of the gears even when the axles are moved out of parallelism. It will be seen that the universal mounting of the shafts 6 and 7 requires some such tooth construction, as otherwise the engagement between the gears would have to be very loose, or else such gears would be broken when the shafting shifted thus throwing the gears out of the same plane. By the arrangement illustrated a proper driving connection is always maintained between the gears, and they may be shifted with respect to each other without injury to the teeth.

By pivotally supporting the motor framing at 20 upon the axle 7, the proper relation between the axles 7 and 15 is always maintained, and the flexible mounting of the motor on its rear side at 19 relieves the motor parts of undue jar also relieves the frame 1 of the strain which would otherwise be incident to rigidly supporting the motor.

Having thus described my invention and illustrated its use, what I claim as new and desire to secure by Letters Patent is the following:—

1. In combination in a motor vehicle, a frame, two sets of journal boxes mounted for universal movement in the frame, an axle journaled in each set of boxes, a spur gear with rounded teeth on each axle, a counter-shaft intermediate the axles carrying a spur gear with rounded teeth engaging the spur gears on the axles, and drive means for one of the spur gears on the axles.

2. In combination in a motor vehicle, a frame, three sets of journal boxes mounted for universal movement in the frame, a shaft journaled in each set of boxes, wheels and an intermediate spur gear with rounded teeth on each of the end shafts, and a spur gear with rounded teeth on the third shaft in engagement with the spur gears on the other shafts and means for driving one of the spur gears.

3. In combination in a motor vehicle, a frame, a driving motor, a pair of driving axles each provided with a pair of flanged wheels, universally mounted journal boxes carrying the axles, a counter-shaft between the axles, spur gears on the axles, and a spur gear on the counter-shaft, such gears having rounded teeth and a driving connection with the motor.

4. In combination in a motor vehicle, a frame, a driving motor, a pair of driving axles each provided with a pair of flanged wheels, universally mounted journal boxes carrying the axles, a counter-shaft between the axles, universally mounted journal boxes therefor, spur gears on the axles, and a spur gear on the counter-shaft, such gears having rounded teeth and a driving connection with the motor.

5. In combination in a motor vehicle, a body frame, auxiliary frames on each side of the body frame, a journal box mounted for universal movement in each of the auxiliary frames, an axle journaled in the boxes and carrying drive wheels and a driving member, and a driving mechanism engaging the driving member.

6. In combination in a motor vehicle, a body frame, auxiliary frames on each side of the body frame, two sets of journal boxes mounted for universal movement in the auxiliary frames, an axle journaled in each of the sets of the boxes and carrying drive wheels and a driving member, and a driving mechanism engaging one of the driving members.

7. In combination in a motor vehicle, a body frame, auxiliary frames on each side of the body frame, two sets of journal boxes mounted for universal movement in the auxiliary frames, an axle journaled in each of the sets of the boxes and carrying drive wheels and a driving member, a counter-shaft intermediate the axles carrying a driving member, and a driving mechanism engaging one of the driving members.

8. In combination in a motor vehicle, a frame, two sets of journal boxes mounted for universal movement in the frame, an axle journaled in each set of boxes, a driving member on each axle, a counter-shaft intermediate the axles carrying a driving member, and drive means for one of the driving members on the axles.

9. In combination in a motor vehicle, a frame, two sets of journal boxes mounted for universal movement in the frame, an axle journaled in each set of boxes, a spur gear on each axle, a countershaft intermediate the axles carrying a spur gear engaging the spur gears on the axles, and drive means for one of the spur gears on the axles.

10. In combination in a motor vehicle, a frame, three sets of journal boxes mounted for universal movement in the frame, a shaft journaled in each set of boxes, wheels and an intermediate spur gear on each of the end shaft, and a spur gear on the third shaft in engagement with the spur gears on the other shafts and means for driving one of the spur gears.

11. In combination in a motor vehicle, a plurality of wheel frames adapted to move relatively to each other, oppositely disposed journal boxes mounted for universal movement in a pair of said frames, an axle journaled in said boxes and carrying a drive wheel and means for driving the drive wheel.

12. In combination in a motor vehicle, a plurality of wheel frames adapted to move relatively to each other, oppositely disposed journal boxes mounted for universal movement in a pair of said frames, an axle journaled in said boxes and carrying a pair of wheels.

In testimony whereof I have hereunto signed my name in the presence of the two subscribed witnesses.

NILS DAVID LEVIN.

Witnesses:
PAUL CARPENTER,
G. W. CUNNINGHAM.